US008490320B1

(12) United States Patent
Roberts (10) Patent No.: US 8,490,320 B1
(45) Date of Patent: Jul. 23, 2013

(54) FORK-SHAPED FISHING LURE (76) Inventor: Henry C. Roberts, Jasper, TN (US)

( * ) Notice: Subject to any disclaimer, the term of this patent is extended or adjusted under 35 U.S.C. 154(b) by 319 days.

(21) Appl. No.: 12/838,582

(22) Filed: Jul. 19, 2010

(51) Int. Cl.
A01K 85/14 (2006.01)
A01K 85/02 (2006.01)
A01K 85/00 (2006.01)

(52) U.S. Cl.
USPC ........... 43/42.5; 43/42.39; 43/44.2; 43/42.24; 43/42.28; 43/42.31; 43/42.11; 43/42.13; 43/42.15; 43/42.4; 43/42.43

(58) Field of Classification Search
USPC .................. 43/42.5, 42.39, 44.2, 44.6, 42.24, 43/42.26, 42.28, 42.37, 42.38, 42.31, 42.11, 43/42.13, 42.15, 42.1, 42.4, 42.41, 42.43, 43/43.2, 43.6
See application file for complete search history.

(56) References Cited

U.S. PATENT DOCUMENTS

| | | | | |
|---|---|---|---|---|
| 1,709,010 A * | 4/1929 | Foss | .............................. | 43/42.39 |
| 1,888,641 A * | 11/1932 | Toepper | ......................... | 43/42.4 |
| 1,928,367 A * | 9/1933 | Buddle | ........................... | 43/42.5 |
| 1,992,766 A * | 2/1935 | Pflueger | ........................ | 43/42.4 |
| 1,997,802 A * | 4/1935 | Meyer | ............................ | 43/42.13 |
| 2,069,724 A * | 2/1937 | Pflueger | ........................ | 43/42.13 |
| 2,145,283 A * | 1/1939 | Accetta | ........................ | 43/42.43 |
| 2,266,234 A * | 12/1941 | Mitchell | ....................... | 43/42.13 |
| 2,462,828 A * | 2/1949 | Parnell, Sr. | ................... | 43/42.24 |
| 2,481,710 A * | 9/1949 | Arndt | ............................ | 43/42.5 |
| 2,492,064 A * | 12/1949 | Rauh | .............................. | 43/43.2 |
| 2,507,454 A * | 5/1950 | Nelson | ......................... | 43/42.44 |
| 2,565,049 A * | 8/1951 | Sisco | .............................. | 43/42.4 |
| 2,567,813 A * | 9/1951 | Hyland | ........................ | 43/42.41 |
| 2,569,119 A * | 9/1951 | Tallaksen | ..................... | 43/42.41 |
| 2,590,167 A * | 3/1952 | Fasano et al. | .................. | 43/42.4 |
| 2,611,987 A * | 9/1952 | Hagen | .......................... | 43/42.51 |
| 2,619,764 A * | 12/1952 | Mellin | ......................... | 43/42.13 |
| 2,700,240 A * | 1/1955 | Gibbs | ........................... | 43/42.52 |
| 2,948,079 A * | 8/1960 | Malchert | ....................... | 43/42.4 |
| 2,997,804 A * | 8/1961 | Creason, Sr. et al. | ........ | 43/42.06 |
| 3,002,311 A * | 10/1961 | Kyper | .......................... | 43/42.52 |
| 3,387,402 A * | 6/1968 | Mays | ........................... | 43/42.31 |
| 3,405,475 A * | 10/1968 | Ross | ............................. | 43/42.41 |
| 3,518,784 A | 7/1970 | Kling et al. | | |
| 3,662,485 A * | 5/1972 | Klemkowski, Jr. | ............ | 43/42.4 |
| 3,831,307 A * | 8/1974 | Pittman | ....................... | 43/42.31 |
| 4,163,337 A | 8/1979 | Kress | | |
| D255,703 S | 7/1980 | Kent | | |
| 4,432,157 A * | 2/1984 | Gowing | ....................... | 43/42.31 |
| D278,926 S | 5/1985 | Bagley | | |
| 4,520,588 A * | 6/1985 | Hindermyer | ................. | 43/42.06 |
| 4,653,218 A * | 3/1987 | Margulis | ........................ | 43/42.2 |
| 4,665,642 A * | 5/1987 | Steinman | ..................... | 43/42.52 |

(Continued)

FOREIGN PATENT DOCUMENTS

FR 2845565 A1 * 4/2004

Primary Examiner — Darren W Ark
(74) Attorney, Agent, or Firm — Montgomery Patent & Design; Robert C. Montgomery (57) ABSTRACT A fishing lure comprises a rear end enabled to be attached to a fishing line or leader and a front end having a plurality of outer tines with wires for attaching bait and a plurality of inner tines for retaining a fishing hook. The lure further comprises an attached spring-loaded weed guard. A lure skirt is placed over the tines and hook. The body of the lure is reflective and combines with the bait and lure skirt to catch the attention of nearby fish.

9 Claims, 7 Drawing Sheets

U.S. PATENT DOCUMENTS

| | | | | |
|---|---|---|---|---|
| 4,920,685 A * | 5/1990 | Landuydt | | 43/42.1 |
| 5,001,856 A * | 3/1991 | Gentry | | 43/42.31 |
| 5,077,931 A * | 1/1992 | Marshall | | 43/42.4 |
| 5,426,886 A * | 6/1995 | Stanley | | 43/42.31 |
| 5,890,317 A * | 4/1999 | Hollomon | | 43/42.31 |
| D409,271 S | 5/1999 | Norton | | |
| 6,598,336 B2 * | 7/2003 | Link | | 43/42.28 |
| 6,772,553 B2 * | 8/2004 | Phillips et al. | | 43/42.39 |
| 6,836,996 B1 * | 1/2005 | Huppert | | 43/42.39 |
| 6,857,220 B2 | 2/2005 | King | | |
| 6,898,894 B1 * | 5/2005 | Anderson | | 43/42.39 |
| 6,931,785 B1 * | 8/2005 | Johnson | | 43/42.26 |
| 6,978,571 B1 * | 12/2005 | Nemire | | 43/42.31 |
| 7,140,146 B2 * | 11/2006 | Gill | | 43/42.39 |
| 7,197,846 B1 * | 4/2007 | Gibson | | 43/42.5 |
| 7,469,497 B2 * | 12/2008 | Hergott | | 43/42.15 |
| 7,481,018 B1 * | 1/2009 | Adams | | 43/44.2 |
| 7,614,178 B2 * | 11/2009 | Hoyt | | 43/42.31 |
| 7,658,032 B2 * | 2/2010 | Avery | | 43/42.28 |
| 7,694,453 B1 * | 4/2010 | Arrico | | 43/42.13 |
| 7,743,549 B2 * | 6/2010 | Troutman | | 43/42.39 |
| 7,908,787 B2 * | 3/2011 | Finley | | 43/44.2 |
| 8,028,465 B1 * | 10/2011 | Wuensch et al. | | 43/42.5 |
| 2001/0045048 A1 * | 11/2001 | Johnson | | 43/42.39 |
| 2005/0183323 A1 * | 8/2005 | Harrell | | 43/42.39 |
| 2005/0217165 A1 * | 10/2005 | Anderson | | 43/42.39 |
| 2005/0246940 A1 * | 11/2005 | Jones et al. | | 43/42.5 |
| 2006/0053678 A1 * | 3/2006 | Amsler | | 43/42.31 |
| 2006/0201050 A1 * | 9/2006 | Troutman | | 43/42.39 |
| 2007/0107296 A1 * | 5/2007 | Hollomon | | 43/42.31 |
| 2008/0202018 A1 * | 8/2008 | Gill | | 43/42.4 |
| 2009/0211145 A1 * | 8/2009 | Thorne | | 43/42.39 |
| 2011/0010983 A1 * | 1/2011 | Briccetti et al. | | 43/42.31 |

\* cited by examiner

Fig. 7b

FORK-SHAPED FISHING LURE

RELATED APPLICATIONS

The present invention was first described in a notarized Official Record of Invention on Mar. 12, 2009, that is on file at the offices of Montgomery Patent and Design, LLC, the entire disclosures of which are incorporated herein by reference.

FIELD OF THE INVENTION

The present invention relates generally to fishing lures, and more particularly, to a fork-shaped fishing lure adapted for use with various types of lure skirts and baits.

BACKGROUND OF THE INVENTION

A great number of people around the world enjoy fishing. Whether fishing for food or for the sport of it, the calmness and serenity of the sport coupled with the excitement of landing "the big one" makes fishing a popular pastime. As would be expected with the wide spread popularity and lengthy history of fishing, there also exists a wide variety of different kinds of natural and artificial fishing lures. Artificial bait and lures are typically designed to mock a fish's natural food and entice the fish to strike. While artificial lures offer many advantages over such natural or "live" bait, it is commonly accepted that catching fish is easier to accomplish with natural bait. Therefore there is a continuing need to develop more life-like artificial bait which provides higher and higher levels of attraction various types of fish.

Additionally, the majority of lures available are for smaller fish, making fishing for bass or other large fish more difficult. While smaller lures work, they suffer from some distinct disadvantages. Often there is a decreased chance of the large fish striking due to the small size and if the fish does strike the smaller lure, there is a diminished chance of setting the hook. The lightweight construction of the hook and interconnecting components can also increase the risk of losing the fish while trying to reel it in and increase the risk of getting the lure caught on submerged plants or other debris.

Various types of artificial lures intended for use with different sizes and types of fish and for use in varying fishing conditions exist, including jigs, surface lures, spoon lures, plugs, artificial flies, spinnerbait, and swimbait. Each attempts to provide a more effective way to attract the fish, appear more life-like, conceal the hook, or a combination of each. Examples of some of these lures can be seen by reference in several U.S. patents. U.S. Pat. No. 2,997,804, issued in the name of Creason, Sr., et al.; U.S. Pat. No. 4,163,337, issued in the name of Kress; U.S. Pat. No. 4,520,588, issued in the name of Hindermyer; U.S. Pat. No. 5,077,931, issued in the name of Marshall; and, U.S. Pat. No. 6,857,220, issued in the name of King.

Additionally, various designs for fishing lures exist as can be seen by example in U.S. Pat. Nos. D 255,703, issued in the name of Kent; D 278,926, issued in the name of Bagley; and, D 409,271, issued in the name of Norton.

While these devices may accomplish their specific intended purpose, each suffers from one (1) or more disadvantage or deficiency with respect to design, function, or effectiveness. In particular, the previous solutions typically lack the ability to modify the lure for a specific situation or setting. Furthermore, many of the prior attempts fair to provide effective means to prevent entanglement of the lure during the casting and reeling in process performed to attract the fish. Accordingly, there remains a need for a means by which a fishing lure, particularly for large fish, can overcome the above-mentioned disadvantages. The development of the present invention substantially departs from the conventional solutions and in doing so fulfills this need.

SUMMARY OF THE INVENTION

In view of the current lack and inherent problems in the art, the inventor has recognized the need for a novel fishing lure device for attracting and catching fish and thus, an object of the present invention is to solve the aforementioned disadvantages and provide for this need.

Another object of the present invention is to provide a device which is provides a more realistic and "life-like" appearance.

Another object of the present invention is to provide a device which is designed especially for use with larger fish, such as bass.

Yet another object of the present invention is to provide a device which is easily and quickly modified with various other ancillary artificial or live baits to increase its attractiveness as a lure.

Yet another object of the present invention is to provide a device which less likely to become entangled in water debris during casting and reeling.

Yet another object of the present invention is to provide a device which is simple and intuitive to use with little to no training.

Yet another object of the present invention is to provide a device which is durable and economical to manufacture.

One (1) or more of these and other objects of the invention are achieved by providing a fishing lure comprising a generally fork-shaped body including a flat top surface, a flat bottom surface, a sinker aperture, a pair of parallel inner tines extending from the body, a pair of outer tines parallel to the pair of inner tines, and a tapered end having a line aperture for attachment to a fishing line. A hook is removably attached to the body including a hook shank having a bent end terminating in a point, a hook eye opposite the bent end, and a barb adjacent to the point. A weed guard is attached to the hook and includes a pair of guard arms joined at a proximal end and extending at an upward and outward angle from the hook eye and terminating in a bend substantially parallel to and above the hook. The lure also includes a bait attachment member having a rod pivotably attached between end portions of the pair of outer tines and a pair of parallel bait attachment arms extending outwardly from the pair of outer tines. A sinker is removably attached to the body and includes a sinker weight, a sinker wire extending from the weight, and a sinker eye opposite the sinker wire. A mechanical fastener is used for removably attaching the hook and the sinker to the body.

Furthermore, the described features and advantages of the invention may be combined in various manners and embodiments as one skilled in the relevant art will recognize. The invention can be practiced without one or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | fork-shaped fishing lure |
| 20 | top surface |
| 25 | bottom surface |
| 30 | first outer tine |
| 32 | second outer tine |
| 34 | first ringlet |
| 36 | second ringlet |
| 37 | first inner tine |
| 39 | second inner tine |
| 40 | hook |
| 41a | hook eye |
| 41b | barb |
| 42 | weed guard |
| 43a | weed guard proximal end |
| 43b | weed guard distal end |
| 44 | first bait attachment |
| 46 | second bait attachment |
| 47 | bait attachment means |
| 50 | screw |
| 51 | lock nut |
| 52 | washer |
| 55 | sinker |
| 56 | sinker eye |
| 57 | sinker wire |
| 60 | first aperture |
| 62 | second aperture |
| 65 | fishing line snap connector |
| 67 | bell |
| 68 | loop |
| 70 | first plastic bait |
| 71 | skirt |
| 72 | head |
| 73 | aperture |
| 75 | second plastic bait |
| 76 | tail |
| 77 | upper body |
| 100 | fishing rod |
| 105 | fishing line |

DETAILED DESCRIPTION OF THE PREFERRED EMBODIMENT

Figure 4:
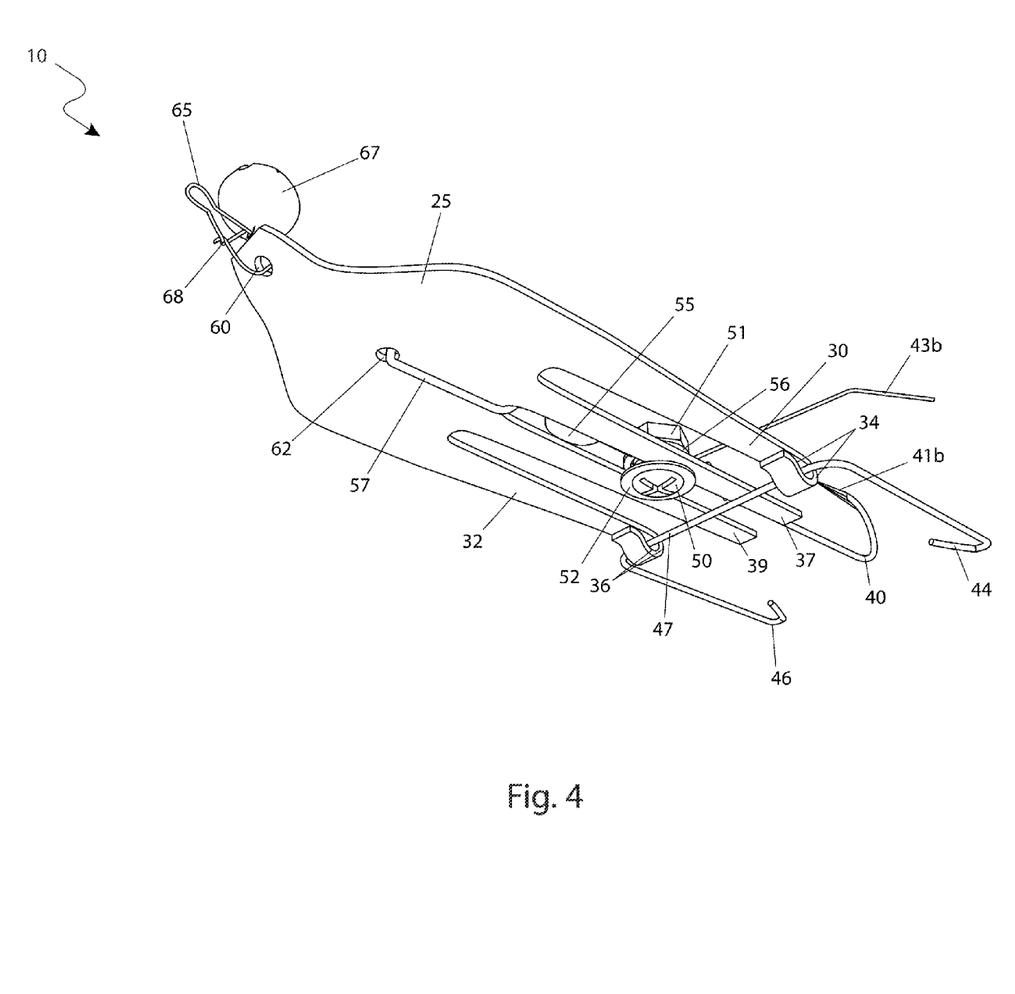
FIG. 4 is another bottom perspective view of the fork-shaped fishing lure 10, according to a preferred embodiment of the present invention.
Figure 5:
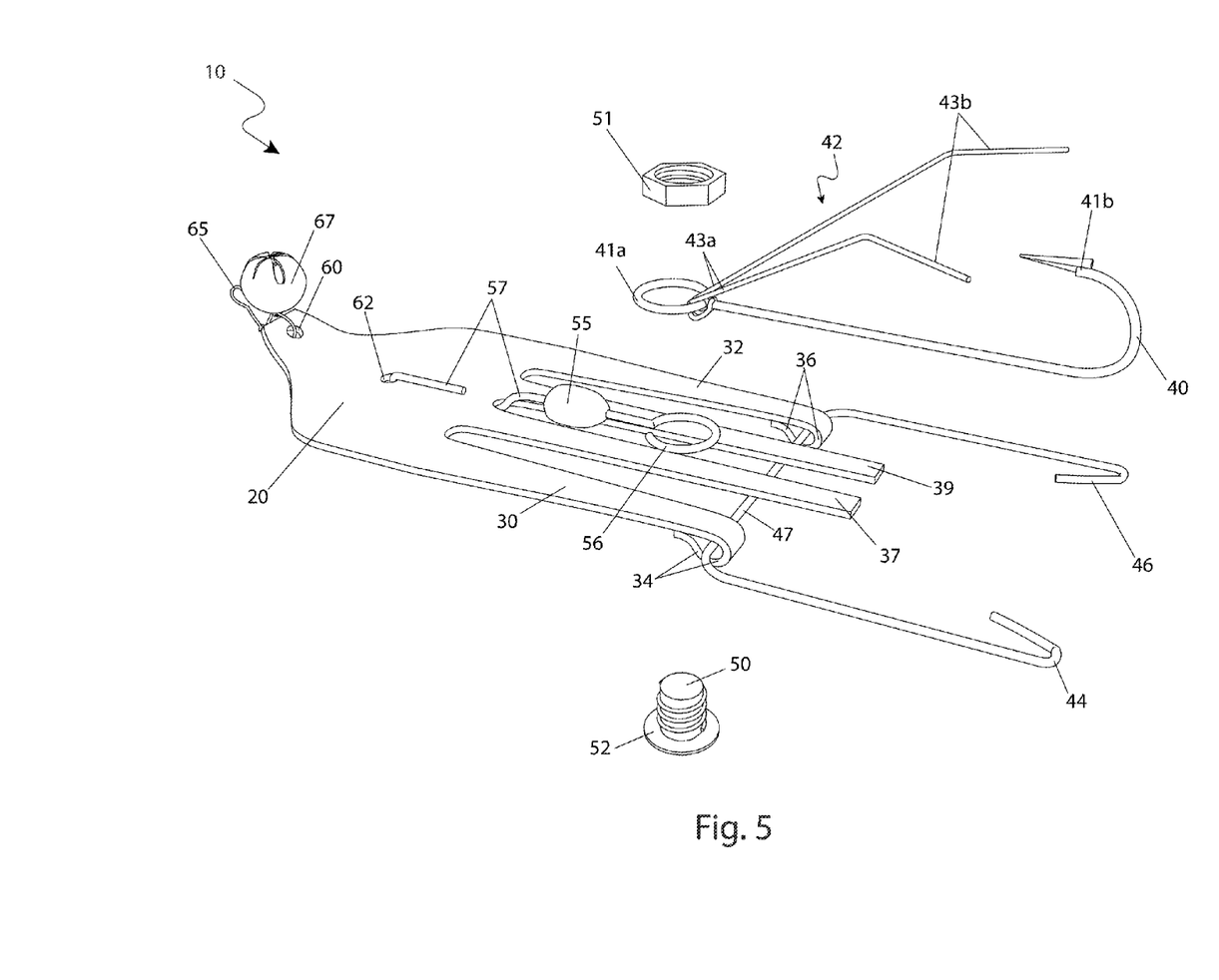
FIG. 5 is an exploded view of the fork-shaped fishing lure 10, according to a preferred embodiment of the present invention.
Figure 6:
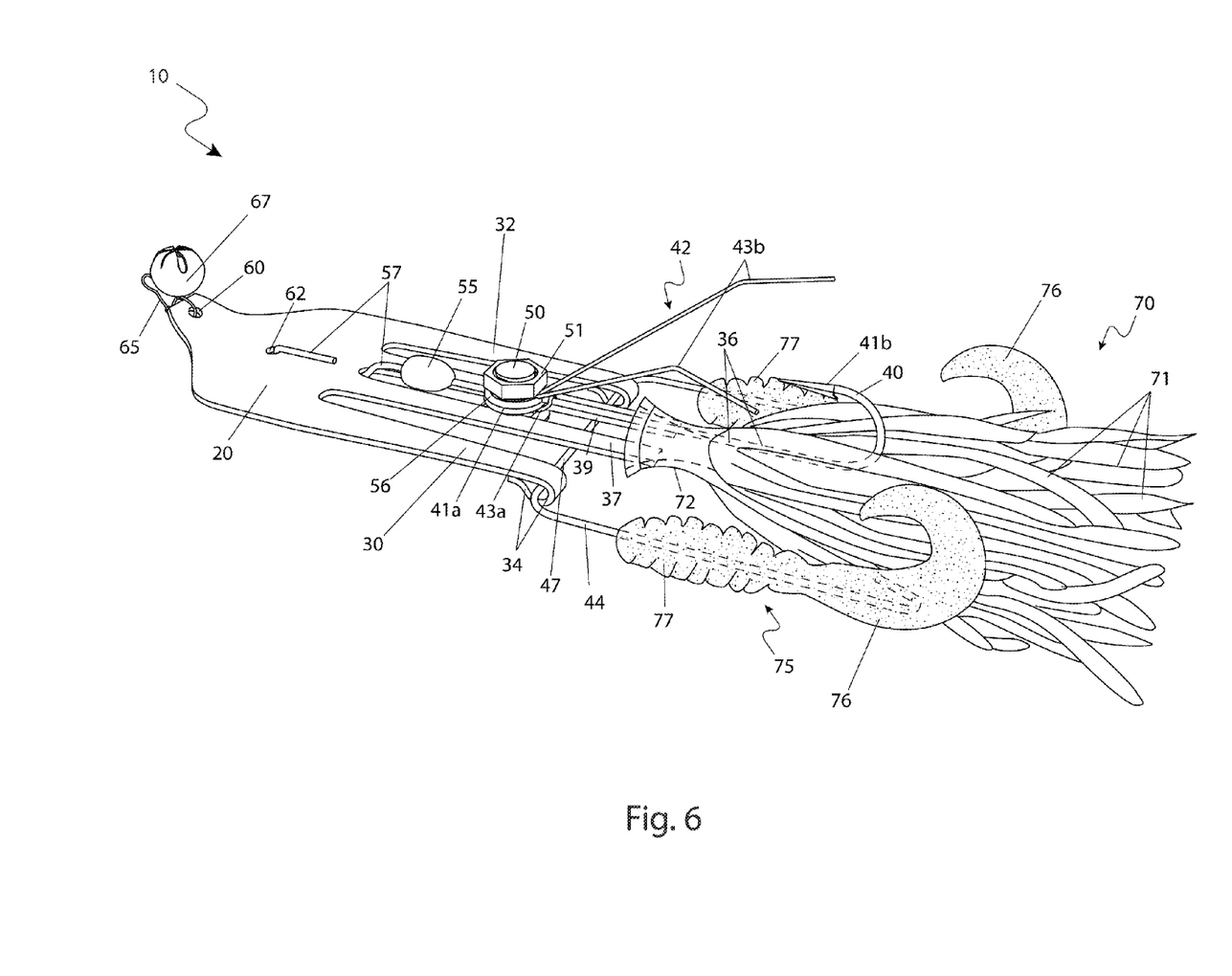
FIG. 6 is a perspective view of the fork-shaped fishing lure 10 illustrating an alternate depiction of the utilization of a hook 40, a first bait attachment 44, and a second bait attachment 46, according to a preferred embodiment of the present invention.
Figure 7A:
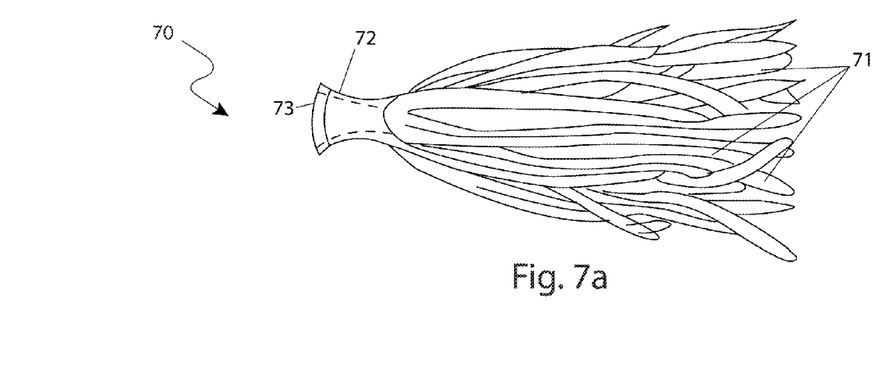
FIG. 7a is a side view of the first plastic bait 70, according to an alternate embodiment of the present invention; and, FIG. 7b is a side view of the second plastic bait 75, according to an alternate embodiment of the present invention.
Figure 7B:
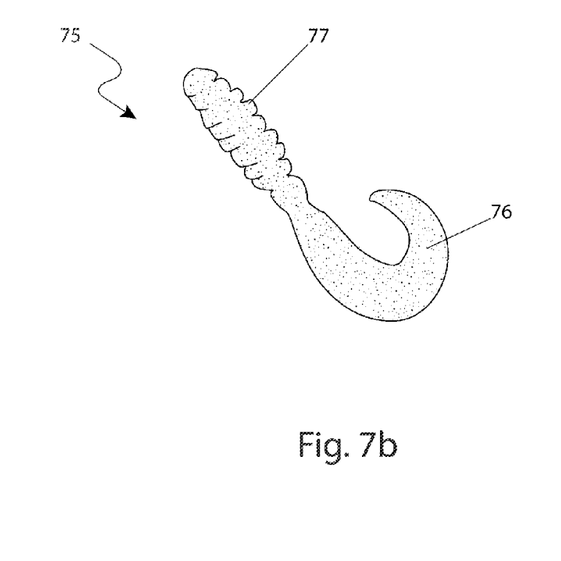

The best mode for carrying out the invention is presented in terms of its preferred embodiment, herein depicted within FIGS. 1 through 5 and alternately within FIGS. 6 through 7b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
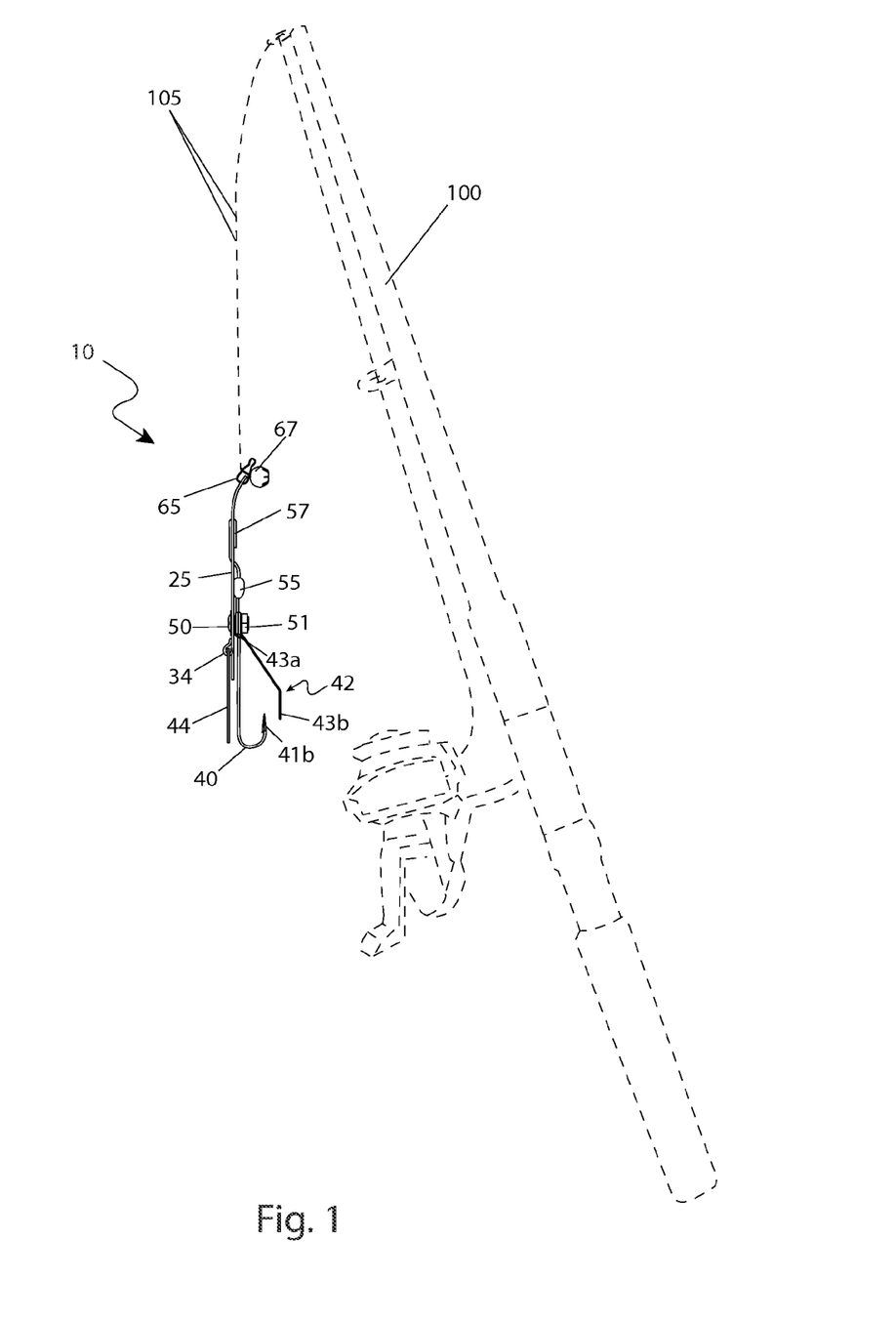
FIG. 1 is an environmental view of a fork-shaped fishing lure 10, according to a preferred embodiment of the present invention.

The present invention describes a forked-shaped fishing lure (herein described as the "device") 10, which provides a fishing lure preferably utilized for catching large fish. Referring now to FIG. 1, an environmental view of the device 10, according to the preferred embodiment of the present invention, is disclosed. The device 10 comprises a form which resembles the body of a dinner fork with the handle portion removed. The device 10 is attached to a fishing line 105 of a fishing rod 100 in a conventional manner. The device 10 generally comprises a top surface 20, a bottom surface 25, a hook 40, a weed guard 42, a sinker 55, a fishing line snap connector 65, and a bell 67. The device 10 is fabricated from a rust-proof material such as, but not limited to: stainless steel, plastic, or the like and may be manufactured in various colors and patterns which incorporate reflective painted designs common to luring fish. The device 10 enables a user to catch larger fish such as, but not limited to: bass, northern pike, muskie, or the like and also set the hook 40 on the desired fish more effectively. The device 10 may be utilized in desired locations such as, but not limited to: a boat, a shoreline, wading, or the like and casted in a desired body of water such as, but not limited to: a lake, a pond, an ocean, or the like.

Figure 2:
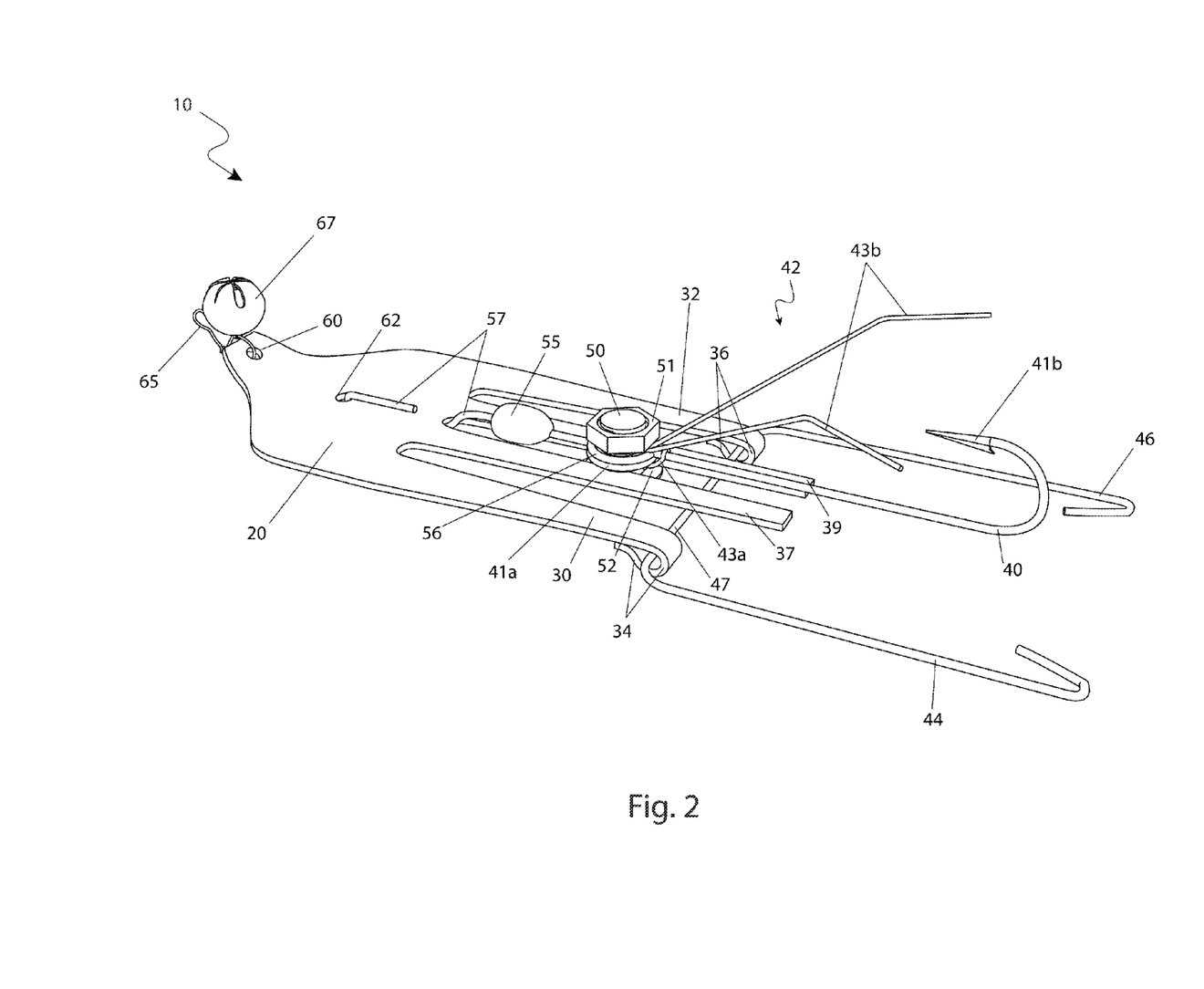
FIG. 2 is a top perspective view of the fork-shaped fishing lure 10, according to a preferred embodiment of the present invention.
Figure 3:
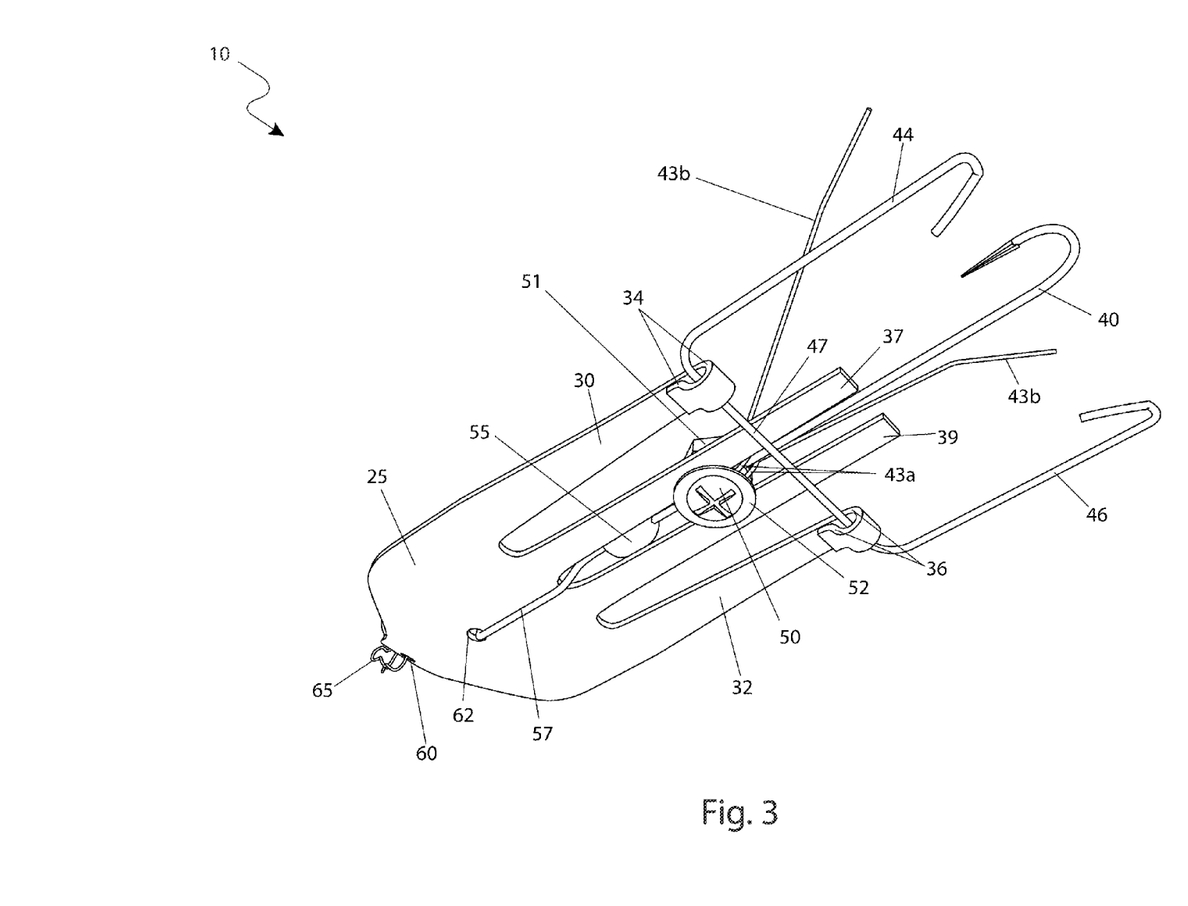
FIG. 3 is a bottom perspective view of the fork-shaped fishing lure 10, according to a preferred embodiment of the present invention.

Referring now to FIG. 2, a top perspective view of the device 10, FIG. 3, a bottom perspective view of the device 10, and FIG. 4, another bottom view of the device 10, according to the preferred embodiment of the present invention, are disclosed. The device 10 comprises a planar body, the body further comprising a first outer tine 30, a second outer tine 32, a first inner tine 37, and a second inner tine 39. The first outer tine 30 and second outer tine 32 each comprise a first ringlet 34 and a second ringlet 36, respectively, thereby providing an attachment means to a bait attachment means 47. Each ringlet 34, 36 is downwardly curved against a bottom surface of each respective outer tine 30, 32, thereby securing the bait attachment means 47 therein. The bait attachment means 47 comprises a "U"-shaped form having a first bait attachment 44 and a second bait attachment 46 in parallel orientation, enabling insertion of various desired conventional plastic baits (see FIG. 6). Each bait attachment 44, 46 comprise slightly bent end portions to secure the desired plastic bait. The inner tines 37, 39 extend beyond each ringlet 34, 36 and also provide an attachment means to other various desired plastic baits. The tines 30, 32, 37, 39 are equally spaced in a parallel orientation and are integrally molded into the device 10.

An intermediate portion of the inner tines 37, 39 provides a securing means to a hook 40, a weed guard 42, a screw 50, and a sinker 55 (also see FIG. 5). The screw 50 is upwardly inserted with respect to the bottom surface 25 between the inner tines 37, 39, thereby enabling a hook eye 41a on the hook 40, a washer 52, a sinker eye 56 on the sinker 55, and a lock nut 51 to be inserted with respect to a top surface 20 and secured against the top surface 20 and bottom surface 25, respectively.

An attachment end of the device 10 opposite the hook end comprises an inwardly and upwardly tapering curvature extending the body of the device 10. A first aperture 60 is located at a distal intermediate portion providing a means for attaching a fishing line snap connector 65 and bell 67 to the device 10. The fishing line snap connector 65 is a conventional fishing device utilized in connecting fishing lures to fishing lines 105 and comprises a single wire which is curved in on itself to form a continuous loop body portion. The fishing line 105 is tied to the fishing line snap connector 65 in a common manner. The bell 67 comprises a loop 68 on an upper surface for slidably attaching the bell 67 onto the fishing line snap connector 65, thereby enabling an audible sound to alert a fish that the device 10 is in the water. The bell 67 produces at least one (1) type of sound. When the bell 67 comes in contact with the top or bottom surfaces 20, 25 of the device 10 another type of sound is produced. The two (2) distinct sounds are intended to acquiring the fish's attention to further lure the fish to the device 10. The bell 67 is a circular signaling device preferably fabricated from a stainless steel material.

Referring now to FIG. 5, an exploded view of the device 10, according to the preferred embodiment of the present invention, is disclosed. The device 10 comprises a sinker 55 utilized to increase the weight and casting distance of the device 10. The sinker 55 further comprises a sinker eye 56 at a distal end and a sinker wire 57 at a proximal end. The sinker eye 56 is positioned at an intermediate portion of the device 10 between the inner tines 37, 39. The sinker wire 57 is inserted into a second aperture 62 from the bottom surface 25 and bent downwardly against the top surface 20, thereby securing the proximal end of the sinker 55.

The hook 40 is a large-sized fishing hook comprising a barb 41b on a distal end and a hook eye 41a on a proximal end, thereby increasing the ability to hook the desired fish. Once the fishing hook 40 impales a fish, the barb 41b becomes snagged into the fish's mouth region. The hook eye 41a provides an attachment means to the weed guard 42 and the screw 50. The weed guard 42 provides a means to prevent the hook 40 from becoming caught on debris, seaweed, lily pads, or other obstacles in the desired body of water. The weed guard 42 comprises a weed guard proximal end 43a and a weed guard distal end 43b. The weed guard proximal end 43a is attached to the hook 40 by bending the weed guard proximal end 43a through the hook eye 41a and around the shaft of the hook 40. The weed guard distal end 43b comprises a slight bend positioned above the barb 41b of the hook 40, thereby guarding the hook 40 to prevent entanglement to undesirable obstacles in the water. The weed guard 42 is fabricated from a stainless steel wire, yet other materials may be utilized without limiting the functions of the device 10.

An appropriately sized washer 52 is inserted onto a screw 50 and each are inserted upwardly from the bottom surface 25 between the inner tines 37, 39. The hook eye 41a and attached weed guard 42 are inserted on the screw 50 from a top surface 20. The sinker eye 56 is attached superjacent to the hook eye 41a on the screw 50. An appropriately sized lock nut 51 threadably engages the screw 50, thereby screwing the sinker eye 56, hook 40, and weed guard 42 between the lock nut 51 and top surface 20.

Referring now to FIG. 6, is a perspective view of the fork-shaped fishing lure 10 illustrating an alternate depiction of the utilization of a hook 40, a first bait attachment 44, and a second bait attachment 46, FIG. 7a, a side view of the first plastic bait 70, and FIG. 7b, a side view of the second plastic bait 75, according to the preferred embodiment of the present invention, are disclosed. The device 10 may be utilized as abovementioned, yet may alternately comprise conventional plastic baits used for attracting fish. The device 10 is preferably packaged with the first plastic bait 70 and a pair of second plastic baits 75, yet the plastic baits 70, 75 may also be purchased as after market accessories. Existing plastic baits 70, 75 may also be utilized with the device 10 without limiting the functions thereof.

The hook 40 provides an attachment means to the first plastic bait 70 which is preferably comprises a skirt 71 and a head 72. The skirt 71 resembles a flamboyant fish tail to lure the hunted fish to the device 10. The head 72 comprises an aperture 73 on an upper surface providing an attachment means to the hook 40 and inner tines 37, 39. The hook 40 is inserted through the aperture 73 and positioned around the inner tines 37, 39, thereby securing the first plastic bait to the device 10. The barb 41b exits from the skirt 71 and is hidden within the skirt 71 enabling a fish to be caught. The first plastic bait 70 in preferably fabricated from a plastic material, yet other materials may be utilized without limiting the functions of the device 10. The first plastic bait is also fabricated in a variety of colors and patterns to lure fishes thereto.

The first bait attachment 44 and second bait attachment 46 may also be utilized for the placement of the pair of second plastic baits 75 for additionally luring fish to the device 10. The second plastic bait 75 is preferably comprised of tube baits further comprising a curled tail 76 and a tubular upper body 77 for luring the hunted fish, yet other devices may be utilized without limiting the functions of the device 10. The upper body 77 of the second plastic bait 75 is slidably inserted onto a desired bait attachment 44, 46 and the tail 76 emulates a swimming motion in the water which lures fish. The second plastic bait 75 is fabricated in a variety of colors and patterns to further lure fish to the device 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 2 through 4 and alternately in FIGS. 6 through 7b.

The method of installing and utilizing the device 10 may be achieved by performing the following steps: acquiring the device 10; attaching an existing fishing line 105 to the fishing line snap connector 65; casting the fishing rod 100 in a conventional manner in a desired body of water; reeling the fishing rod 100 in a desired fashion; enabling the hook 40 to hook onto a fish; enabling the weed guard 42 to prevent the hook 40 from getting caught on undesirable obstacles in a body of water; enabling the sinker 55 to force the device 10 into the body of water; and enabling the device 10 to increase the chance of not only catching larger fish, but enabling a user to increased their ability to set the hook 40 and land a fish as well.

The method of utilizing the device 10 in an alternate method may be achieved by performing the following steps: acquiring the device 10; attaching a first plastic bait 70 onto the device 10 via slidably engaging the aperture 73 around the hook 40 and fitting the aperture 73 around the inner tines 37, 39; inserting a desired second plastic bait 75 to the bait attachment means 47 via slidably inserting the upper body 77 into a desired bait attachment 44, 46; attaching an existing fishing line 105 to the fishing line snap connector 65; casting the fishing rod 100 in a conventional manner in a desired body of water; reeling the fishing rod 100 in a desired fashion; enabling the skirt 71 on the first plastic bait 70 and tails 76 and upper body 77 on the second plastic bait 75 to lure desired fish to the device 10; enabling the hook 40 to hook a fish; enabling the weed guard 42 to prevent the hook 40 from getting caught on undesirable obstacles in a body of water; enabling the sinker 55 to force the device 10 into the body of water; and enabling the device 10 to increase the chance of not only catching larger fish, but enabling a user to increased their ability to set the hook 40 and land a fish as well.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fishing lure comprising:
    a fork-shaped body having generally flat top and bottom surfaces, a plurality of tines, and a tapered end opposite said plurality of tines;
    a hook removably attached to a generally central location of said body;
    a weed guard attached to the generally central location of said body; and,
    a bait attachment member;
    wherein said plurality of tines further comprises a pair of inner tines and a pair of outer tines, each of said pair of outer tines comprises a means to attach and position said bait attachment member which further comprises an end portion of each of said pair of outer tines terminating in a downwardly curved ringlet;
    wherein said hook, said weed guard, and a weighting means are attached to said body by a fastening means;
    wherein said pair of inner tines provides a means to removably attach at least one lure skirt;
    wherein said bait attachment member comprises a rod disposed through said curved ringlets on said pair of outer tines, said rod extending between said end portions of said pair of outer tines in a plane which is below said flat bottom surface; and,
    wherein said bait attachment member provides a means to removably attach at least one of a plurality of baits.

2. The lure of claim 1, wherein said lure further comprises said weighting means removably attachable to said body by said fastening means.

3. The lure of claim 2, wherein said weighting means further comprises:
    a sinker weight;
    a sinker eye extending from said sinker weight; and,
    a sinker wire opposite said sinker eye.

4. The lure of claim 1, wherein said tapered end further comprises:
    a line attachment aperture disposed at a central position of said tapered end; and,
    a fishing line snap connector attached through said line attachment aperture, said snap connector being removably attached to a fishing line.

5. The lure of claim 1, wherein said hook further comprise a hook shank having a bent end terminating in a point, a hook eye opposite said bent end, and a barb adjacent to said point.

6. The lure of claim 1, wherein said bait attachment member further comprises said rod pivotably attached to end portions of said pair of outer tines and a pair of parallel bait attachment arms extending outwardly from said pair of outer tines.

7. A fishing lure comprising:
    a generally fork-shaped body comprising a flat top surface, a flat bottom surface, a sinker aperture, a pair of parallel inner tines extending from said body, a pair of outer tines parallel to said pair of inner tines, and a tapered end having a line aperture for attachment to a fishing line;
    a hook removably attached to said body, said hook comprising a hook shank having a bent end terminating in a point, a hook eye opposite said bent end, and a barb adjacent to said point;
    a weed guard attached to said hook, said weed guard comprising a pair of guard arms joined at proximal ends thereof and extending at an upward and outward angle from said hook eye and terminating in bends substantially parallel to and above said hook;
    a bait attachment member comprising a rod pivotably attached between end portions of said pair of outer tines and a pair of parallel bait attachment arms extending outwardly from said pair of outer tines, said rod extending between said end portions of said pair of outer tines in a plane which is below said flat bottom surface;
    a sinker removably attached to said body, said sinker comprising a sinker weight, a sinker wire extending from said weight, and a sinker eye opposite said sinker wire; and,
    a mechanical fastener for removably attaching said hook and said sinker to said body.

8. The lure of claim 7, wherein said sinker weight is disposed on said top surface with said sinker eye above an open area defined between said pair of inner tines and said sinker wire extending over said bottom surface and engaged through said sinker aperture; and,
    wherein said hook eye is disposed above and aligned with said sinker eye;
    whereby said mechanical fastener extends through said open area and through said sinker eye and hook eye.

9. The lure of claim 8, wherein said end portions of said pair of outer tines terminating in downwardly curved ringlets; wherein said rod is disposed through said ringlets on said pair of outer tines.

* * * * *